C. E. HASTINGS.
SIDE CAR ATTACHMENT FOR MOTORCYCLES.
APPLICATION FILED OCT. 30, 1919.
1,392,938. Patented Oct. 11, 1921.
2 SHEETS—SHEET 1.
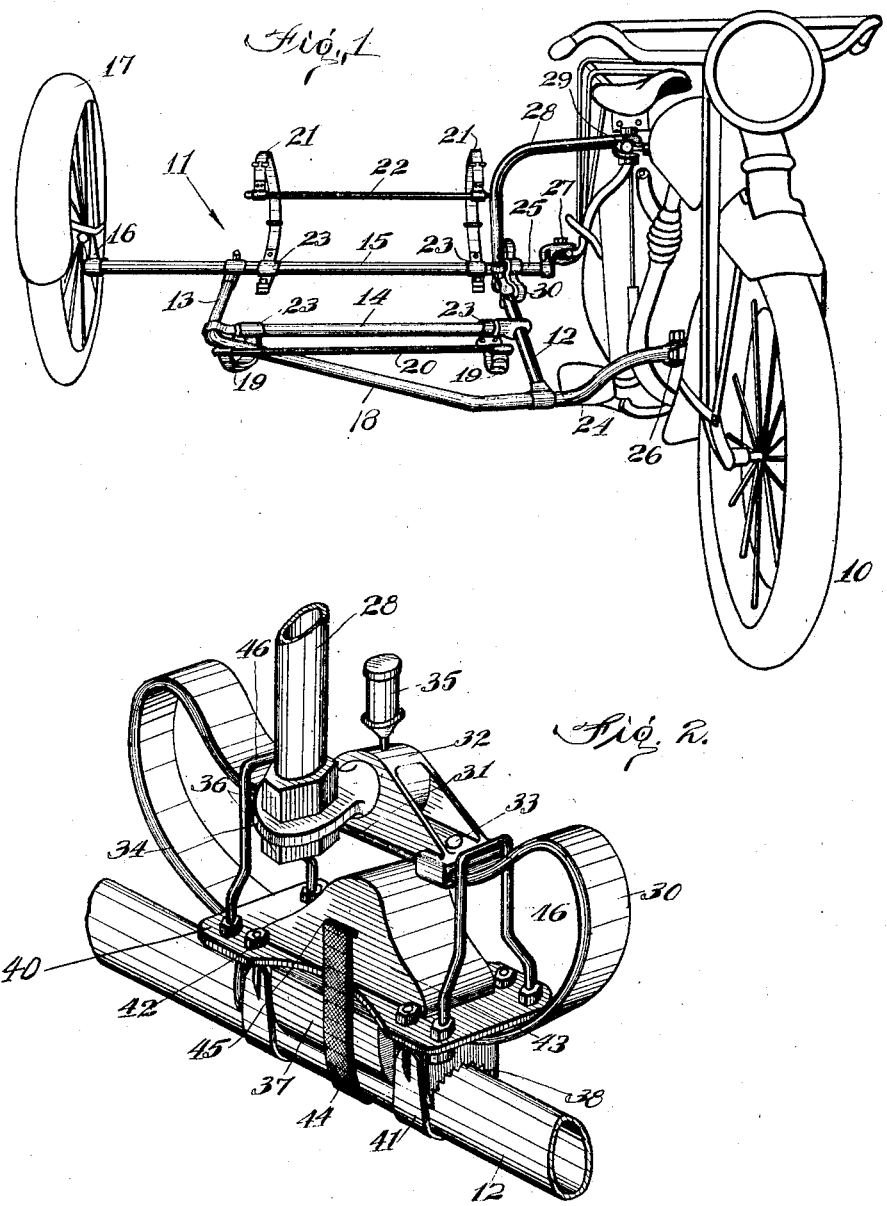
WITNESSES:
INVENTOR
Charles E. Hastings
BY
Jones, Addington, Ames & Seibold,
ATTORNEY

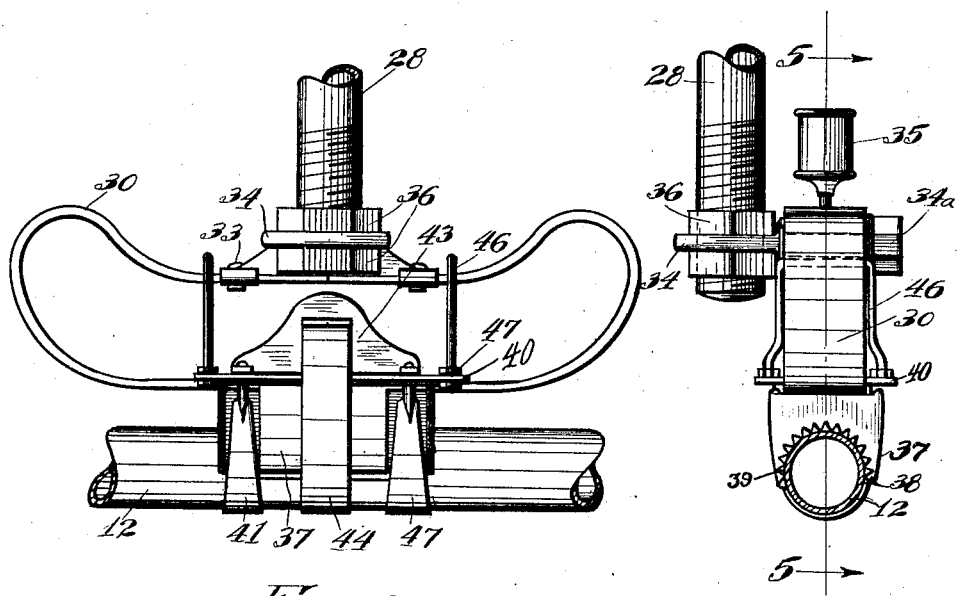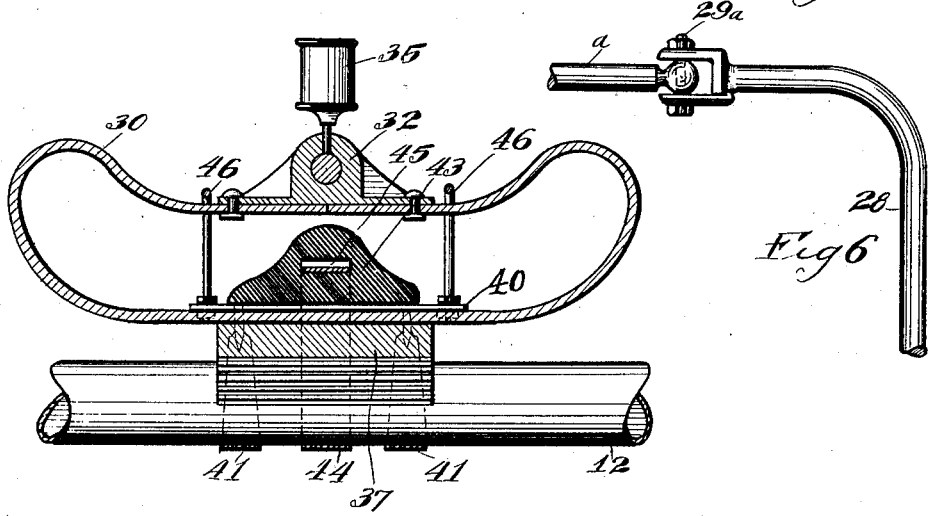

UNITED STATES PATENT OFFICE.

CHARLES E. HASTINGS, OF CHICAGO, ILLINOIS, ASSIGNOR TO NATIONAL DAIRY MACHINE COMPANY, OF GOSHEN, INDIANA, A CORPORATION OF INDIANA.

SIDE-CAR ATTACHMENT FOR MOTORCYCLES.

1,392,938.　　　　　Specification of Letters Patent.　　Patented Oct. 11, 1921.

Application filed October 30, 1919. Serial No. 334,434.

*To all whom it may concern:*

Be it known that I, CHARLES E. HASTINGS, a citizen of the United States, residing at Chicago, in the county of Cook and State of Illinois, have invented new and useful Improvements in Side-Car Attachments for Motorcycles, of which the following is a full, clear, concise, and exact description, reference being had to the accompanying drawing, forming a part of this specification.

This invention relates to improvements in side car attachments for motor cycles.

One object of my invention is to provide means whereby the side car will be connected with the motor cycle in such a manner as to minimize the communication of jolts, jars and vibrations from the side car to the motor cycle and vice-versa.

A further object is the production of a construction in which the side car frame will be possessed of great strength and rigidity, and in which the connection of the side car to the motor cycle will relieve to the greatest extent possible the strain upon the motor cycle when the same is in use.

A still further object is the provision of a resilient element for use in the connection between the side car and the motor cycle which at the same time that said element possesses resilient qualities for absorbing vertically directed shocks and jars, is so constructed as to be possessed of great strength and rigidity against lateral or horizontal yielding.

Further objects will appear from the detailed description to follow and from the appended claims.

In the drawings in which one embodiment of my invention is shown

Figure 1 is a perspective view of a side car (with the body omitted) shown in operative relation with a motor cycle;

Fig. 2 is an enlarged perspective view of the spring arrangement between the motor cycle and the side car frame;

Fig. 3 is a side elevation of the spring arrangement;

Fig. 4 is an end view of the spring arrangement;

Fig. 5 is a sectional view taken along lines 5—5 of Fig. 4, and

Fig. 6 is a fragmentary detail showing the connection between the upper end of the vertically disposed connecting arm and the motor cycle frame.

The embodiment of the invention shown comprises a motor cycle 10 of conventional design to which is connected a side car frame construction 11. The side car frame comprises inner and outer longitudinally extending frame members 12 and 13 and transversely extending frame members 14 and 15, the latter constituting the rear axle of the side car and having an offset bracket 16 at its outer end which supports the side car wheel 17. The frame member 13 is provided at its front end with a diagonally disposed extension 18 which is connected at its front end with the corresponding end of frame member 12 (Fig. 1).

Longitudinally extending springs 19 are secured to the frame member 14 and are connected at their front ends by a bar 20. The rear cross frame member 15 has correspondingly applied thereto supporting springs 21 which are connected by a bar 22. These springs 19 and 21 are fastened to the frame members 14 and 15 by clips 23 which clamp upon said frame members.

The side car frame thus produced possesses great strength and rigidity and the mounting of the car body thereon is such that said body will be yieldingly supported, affording ease and comfort to the rider.

The frame members 14 and 15 are extended laterally to form rigid side extensions 24 and 25 which are adapted to be pivotally connected at 26 and 27 with the motor cycle. Relative vertical movement of the side car is limited by means of an angularly formed vertically disposed arm 28, the upper end of which is connected at 29 to the motor cycle. The connections 26 and 27 are of the ball and socket type which permit of universal pivotal movement. The ball parts of these connections are carried by or fastened to the motor cycle, the socket parts being connected with the side car structure, as will be readily understood. The arrangement is such that a connection between the side car and the motor cycle is provided which is rigid in a horizontal direction establishing a firm connection between the two vehicle parts for propulsion purposes. At the same time the connection permits considerable relative movement vertically or in a direction necessary to permit of vertical shocks and jars such as are received in the travel of a device over the ground being absorbed and not transmitted from one part to the other. This ball and socket arrangement is also of special importance in that it affords an arrangement which will compensate for slight inaccuracy in manufacture, it being clear that should error of alinement of the parts be found during assembling, the parts of the ball and socket connections will move relatively to each other and thus compensate for the discrepancy.

The connection 29 (Figs. 1 and 6) between the upper end of arm 28 and the motor cycle frame is accomplished by providing the ball and socket connection of the type shown in the connections 26 and 27 with the addition of a bolt 29ª passed through the jaws and through the ball. In this manner a rigid connection is provided at this point between the motor cycle and side car frame to prevent vertical movement of each with respect to the other.

The lower end of the arm 28 is connected with the side car frame member 12 by means of a spring 30 of substantially elliptic form, which spring is of a one piece type having its ends abutting each other at 31 and held in place by means of a block or connecting member 32. Bolts 33 serve to rigidly fasten the ends of said spring to the member 32. Said block 32 is formed with an opening or bearing therein to rotatively support the shank of an eye 34, a nut 34ª and coöperating washers serving to hold said shank in place in said block. Suitable oiling means in the form of an oil cup 35 is provided in the upper side of said block to oil said bearing. The eye 34 receives the lower end of the arm 28, said arm being adjustably connected therewith by means of nuts 36 threaded upon said arm and which engage against opposite sides of said eye.

The spring 30 is connected with the side car frame member 12 by means of a base block 37 having longitudinally extending teeth 38 at its under side which interlock with correspondingly formed teeth 39 provided on the frame member 12. These interlocking teeth serve to positively lock the base block 37 against relative rotation or lateral movement notwithstanding vibration and throbbing to which the device is subjected when in use. A plate 40 rests on the inside of the lower portion of the spring 30. Clamping bands 41 surround said frame member 12 and block 37, said bands terminating in integrally formed threaded portions which pass up through the plate member 40 being held in operative relation therewith by means of nuts 42. The spring 30 thus is held positively to the frame member of the side car and through the arm 28 and eye member 36 pivotally mounted in the block 32, has a yielding connection with the motor cycle and permits of relative pivotal movement of said arm in a plane extending longitudinally of the side car and further permits of relative vertical adjustment of said arm 28, by means of nuts 36 engaging opposite sides of said eye member.

The arm 28 being rigidly connected at 29 to the motor cycle frame as before described, prevents vertical movement of the side car relative to the motor cycle at this point, but, however, through the connection of the lower end of the arm 28 with the side car frame, as described, an arrangement is provided through the medium of the spring 30, to which said arm is pivotally connected, whereby the arm does not at any time come in direct contact with the side car, a resilient connection thereby being established at this point. It can thus be seen that in the operation of the motor cycle, shocks and jars will not be transferred from the side car to the motor cycle or vice versa, but will be absorbed by said connection as above mentioned.

My device affords further means to protect the spring 30 when the latter is subjected to excessive compression or excessive upward flexing due to excessive bumping or jarring or the action of the motor cycle with respect to the side car when turning corners. This protecting means in case of excessive compression comprises a cushion 43 of suitable resilient material which is supported on said p'ate 40 and is held thereon by means of a strap 44 passing through an opening 45 in said cushion and around the block member 37 and frame member 12.

The arrangement is such that the cushion 43 will not be brought into play during slight compression of the spring such as results from ordinary vibration of the side car or motor cycle, the cushion being adapted, however, to be engaged by the upper side of said spring when excessively depressed, thus helping to absorb the shock to which the same is subjected and to prevent breakage thereof.

For guarding said spring against excessive upward flexing inverted U-shaped clips 46 are provided, the ends thereof being secured by nuts 47 to the plate member 40; said clips pass upwardly around the spring 30 and when said spring is in its normal position, the clips will extend above the same to allow for a limited degree of upward flexing movement of the spring. However, in the event of excessive upward flexing of said spring, said clip members limit the upward movement thereof preventing rupture of the spring such as might otherwise result.

It has been found that with a spring of semi-elliptic form in which the arm 28 was connected with a free end of the former, said end was incapable of withstanding severe lateral strains and yielded thereunder and frequently broke. With the elliptic formation of spring, however, the free spring end is done away with, and each side of the spring serves as a reinforcement for the other with the result that a spring of exceptional lateral rigidity is produced and one which therefore is not so liable to break under lateral strains. The clips 46 will serve also to prevent any lateral movement of the upper portion of said spring, due to their upper portion being contracted to be of substantially the same width as the spring.

While I have illustrated and described the preferred form of my invention herein, any variations and modifications thereof may be made without departing from the spirit of my invention. I therefore do not wish to be limited to the precise details of construction set forth, but desire to avail myself of such variations and modifications as come within the scope of the appended claims.

Having thus described my invention, what I claim as new and desire to secure by Letters Patent is:

1. The combination with a motor cycle frame, of a side car comprising a frame having a resilient connection with said motor cycle frame, said connection comprising an elliptic spring member having a positive clamping engagement with said side car frame member and pivotally connected with said motor cycle frame member.

2. The combination with a motor cycle frame, of a side car comprising a frame having a resilient connection with said motor cycle frame, said connection comprising a spring member having a positive clamping engagement with said side car frame member and pivotally connected with said motor cycle frame member, said pivotal connection having oiling means therefor.

3. The combination with a motor cycle frame, of a side car comprising a frame having a resilient connection with said motor cycle frame, said connection comprising a spring member having a positive clamping engagement with said side car frame member and pivotally connected with said motor cycle frame member, said positive connection between said spring and side car frame comprising teeth capable of engaging each other.

4. The combination with a motor cycle frame, of a side car comprising a frame having operative connection with said motor cycle frame, an elliptic spring, an arm having its upper end connected with said motor cycle frame and its lower end pivotally connected with said elliptic spring, said spring being supported on said side car frame member, and means between the upper and lower portions of said spring to prevent excessive compression thereof.

5. The combination with a motor cycle frame, of a side car comprising a frame having operative connection with said motor cycle frame, a spring member, an arm having its upper end connected with said motor cycle frame and its lower end pivotally connected with said spring member, said spring member being supported on said side car frame member, and means surrounding a portion of said spring for limiting the upward flexing movement thereof.

6. The combination with a motor cycle frame, of a side car comprising a frame having operative connection with said motor cycle frame, a spring member, an arm having its upper end connected with said motor cycle frame and its lower end pivotally connected with said spring member, said spring member being supported on said side car frame member, and means surrounding a portion of said spring for limiting the upward flexing movement thereof, said means comprising a plurality of clip members.

7. The combination with a motor cycle frame, of a side car comprising a frame having operative connection with said motor cycle frame, a connection between said motor cycle frame and said side car frame comprising a spring, said spring being of one-piece construction, the ends of which engage each other to prevent lateral flexing of said spring.

8. The combination with a motor cycle frame, of a side car comprising a frame having operative connection with said motor cycle frame, a connection between said motor cycle frame and said side car frame comprising a spring, said spring being of one-piece construction, the ends of which engage each other to prevent lateral flexing of said spring, and means clamping said spring to prevent the ends of the spring from separating.

9. The combination with a motor cycle frame, of a side car comprising a frame having operative connection with said motor cycle frame, a connection between said motor cycle frame and said side car frame comprising a spring, said spring being of one-piece construction, the ends of which engage each other to prevent lateral flexing of said spring, and a block member for holding the ends of said spring in engagement with each other.

10. The combination with a motor cycle frame, of a side car comprising a frame having operative connection with said motor cycle frame, a connection between said motor cycle frame and said side car frame, comprising a spring, said spring being of one-piece construction, the ends of which engage each other to prevent lateral flexing of said spring, a block member for holding the ends of said spring in engagement with each other, said block member receiving a portion of said motor cycle frame.

11. The combination with a motor cycle frame, of a side car comprising a frame having operative connection with said motor cycle frame, a connection between said motor cycle frame and said side car frame comprising a spring, said spring being of one-piece construction, the ends of which engage each other to prevent lateral flexing of said spring, a block member for holding the ends of said spring in engagement with each other, said block member receiving a portion of said motor cycle frame, and acting as a bearing therefor.

12. The combination with a motor cycle frame, of a side car comprising a frame having operative connection with said motor cycle frame, an arm having one end connected with said motor cycle frame, a spring interposed between the other end of said arm and said side car frame, and means coöperating with said spring both to limit excessive compression thereof and to limit excessive upward flexing thereof.

13. The combination with a motor cycle frame, of a side car comprising a frame having operative connection with said motor cycle frame, a spring member, an arm having one end connected with said motor cycle frame and its lower end pivotally connected with said spring member, said spring member being positively clamped to said side car frame, single means for limiting excessive compression of said spring and a plurality of means for limiting excessive upward flexing of said spring.

14. The combination with a motor cycle frame, of a side car comprising a frame having operative connection with said motor cycle frame, a spring member, an arm having one end connected with said motor cycle frame and its lower end pivotally connected with said spring member, said spring member being positively clamped to said side car frame, single means for limiting excessive compression of said spring, a plurality of means for limiting excessive upward flexing of said spring, and a plate member supporting all of said means.

15. The combination with a motor cycle frame, of a side car comprising a frame having operative connection with said motor cycle frame, a spring member, an arm having one end connected with said motor cycle frame and its lower end pivotally connected with said spring member, clamping bands to positively clamp said spring to said side car frame, a plurality of means limiting excessive compression and excessive upward flexing of said spring, and plate members supporting said clamping bands and the means for limiting excessive compression and excessive flexing of said spring.

16. The combination with a motor cycle frame, of a side car comprising a frame having operative connection with said motor cycle frame, a spring member, an arm having one end connected with said motor cycle frame and its lower end pivotally connected with said spring member, said spring member being positively clamped to said side car frame, a cushion to prevent excessive compression of said spring, and a strap member holding said cushion on said side car frame.

17. The combination with a motor cycle frame, of a side car comprising a frame having operative connection with said motor cycle frame, a spring member, an arm having one end connected with said motor cycle frame and its lower end pivotally connected with said spring member, said spring member being positively clamped to said side car frame, a cushion to prevent excessive compression of said spring, a plate member supporting said cushion, and a strap member holding said cushion on said plate member.

18. The combination with a motor cycle frame, of a side car comprising a frame having operative connection with said motor cycle frame, a spring member, an arm having one end connected with said motor cycle frame and its lower end pivotally connected with said spring member, said spring member being positively clamped to said side car frame, a cushion to prevent excessive compression of said spring, a plate member supporting said cushion, a strap member holding said cushion on said plate member, and an opening in said cushion to receive said strap member.

19. The combination with a motor cycle frame, of a side car comprising a frame having operative connection with said motor cycle frame, a connection between said motor cycle frame and said side car frame comprising a spring, said spring being of one-piece construction, and means coöperating with said spring to prevent lateral flexing thereof.

20. The combination with a motor cycle frame, of a side car comprising a frame having operative connection with said motor cycle frame, a connection between said motor cycle frame and said side car frame comprising a spring, said spring being of one-piece construction, and means clamping said spring to prevent the ends thereof from moving out of a vertical plane with respect to each other.

21. The combination with a motor cycle frame, of a side car comprising a frame having operative connection with said motor cycle frame, a connection between said motor cycle frame and said side car frame comprising a spring, said spring being of one-piece construction, and means clamping said spring to prevent the ends thereof from moving out of a vertical and horizontal plane with respect to each other.

22. The combination with a motor cycle frame, of a side car comprising a frame having operative connection with said motor cycle frame, said side car frame comprising side and end members, a spring member having two spaced U-shaped portions lying substantially in the vertical plane of one of said members of the side car frame, and an arm connecting said spring with the motor cycle frame.

23. The combination with a motor cycle frame, an arm member, a side car comprising a frame having operative connection with said motor cycle frame, said side car frame comprising side and end members, a spring member having two U-shaped portions lying substantially in the vertical plane of one of said side members of the side car frame, and a member for connecting the upper ends of the U-shaped portions, said member forming a connecting means between said arm member and said spring.

24. The combination with a motor cycle frame, of a side car comprising a frame having operative connection with said motor cycle frame, said side car frame comprising side and end members, a spring member having two U-shaped portions lying substantially in the vertical plane of one of said side members of the side car frame, and U-shaped clip members coming over the U-shaped portions respectively to limit their upward yielding.

25. The combination with a motor cycle frame, of a side car comprising a frame having operative connection with said motor cycle frame, said side car frame comprising side and end members, a spring member having two U-shaped portions lying substantially in the vertical plane of one of said side members of the side car frame, and a bumper surrounded by said U-shaped portions for limiting the downward movement of the spring.

26. The combination with a motor cycle frame, of a side car comprising a frame having operative connection with said motor cycle frame, said side car frame comprising side and end members, a spring member having two U-shaped portions lying substantially in the vertical plane of one of said side members of the side car frame, and U-shaped clips serving to hold the spring in place on said side member.

27. The combination with a motor cycle frame, of a side car comprising a frame having operative connection with said motor cycle frame, said side car frame comprising side and end members, a spring member having two U-shaped portions lying substantially in the vertical plane of one of said side members of the side car frame, an arm member and a combined connecting and bearing member for connecting said spring to said arm member.

28. The combination with a motor cycle frame, of a side car comprising a frame having operative connection with said motor cycle frame, a connecting member having one end connected with said motor cycle frame at a point spaced vertically from said side car frame, and a resilient member of substantially elliptic form connecting the opposite end of said connecting member with said side car frame.

29. The combination with a motor cycle frame, of a side car comprising a frame having operative connection with said motor cycle frame, a connecting member having one end connected with said motor cycle frame at a point spaced vertically from said side car frame, and a resilient member having two integral substantially U-shaped portions, said resilient member connecting the opposite end of said connecting member with said side car frame.

30. The combination with a motor cycle frame, of a side car comprising a frame having operative connection with said motor cycle frame, a connection between said motor cycle frame and said side car frame comprising a substantially elliptic spring, and means engaging the sides of said spring to prevent lateral flexing thereof.

31. The combustion with a motor cycle frame, of a side car comprising a frame having operative connection with said motor cycle frame, a connection between said motor cycle frame and said side car frame comprising a substantially elliptic spring, and means adapted to prevent lateral flexing of said spring and to limit upward flexing thereof.

32. The combinaton with a motor cycle frame, of a side car comprising a frame having operative connection with said motor cycle frame, a connection between said motor cycle frame and said side car frame comprising a substantially elliptic spring, said spring being of one-piece construction, and means engaging the sides of said spring to prevent lateral flexing thereof.

33. The combination with a motor cycle frame, of a side car comprising a frame having operative connection with said motor cycle frame, a connection between said motor cycle frame and said side car frame comprising a spring, said spring being of one-piece construction, and means engaging the sides of said spring to prevent lateral flexing thereof, said means comprising a plurality of clip members.

34. The combination with a motor cycle frame, of a side car comprising a frame having operative connection with said motor cycle frame, a connection between said motor cycle frame and said side car frame, comprising a spring, and means extending upwardly and supported by said side car frame to prevent lateral flexing of said spring.

35. The combination with a motor cycle frame, of a side car comprising a frame having operative connection with said motor cycle frame, said connection comprising an elliptic spring, and an arm having its upper end rigidly connected with said motor cycle frame and its lower end pivotally connected with said elliptic spring.

In witness whereof, I have hereunto subscribed my name.

CHARLES E. HASTINGS.